Feb. 23, 1943. H. B. BROOKS 2,312,022
CONSTANT DIRECT CURRENT SOURCE
Filed May 3, 1940 3 Sheets-Sheet 1
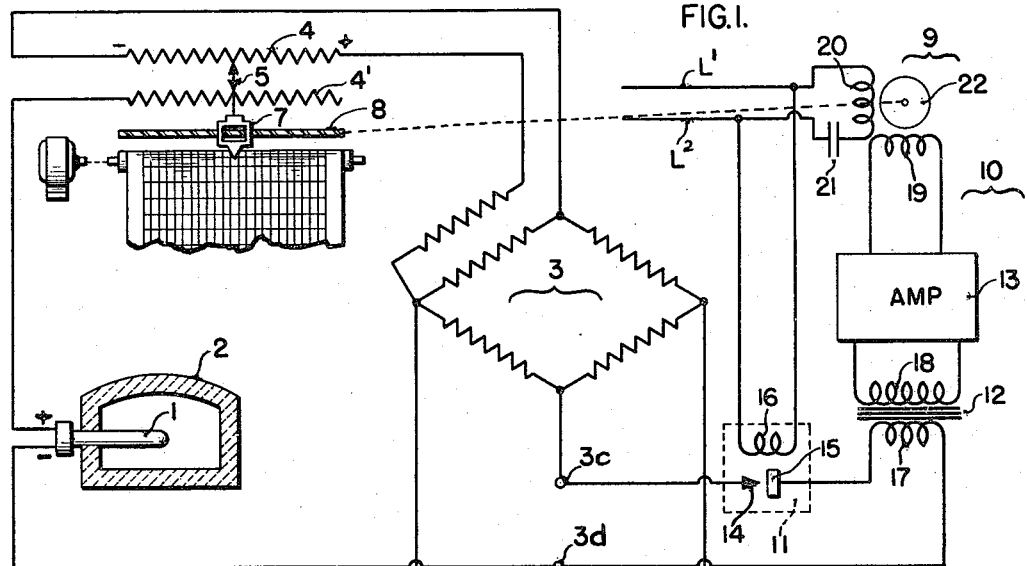
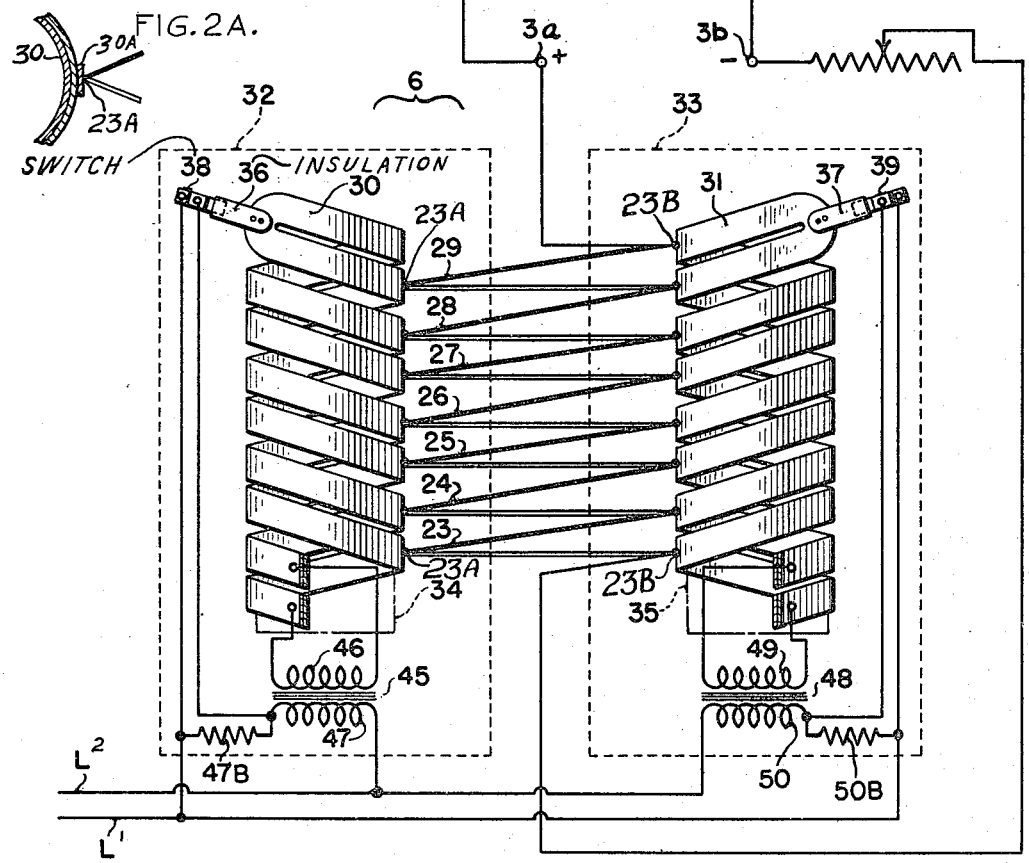
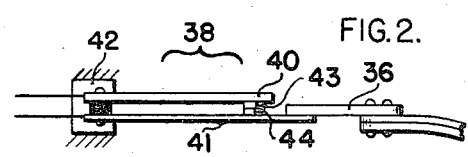
INVENTOR.
HERBERT B. BROOKS
BY C. B. Spangenberg
ATTORNEY

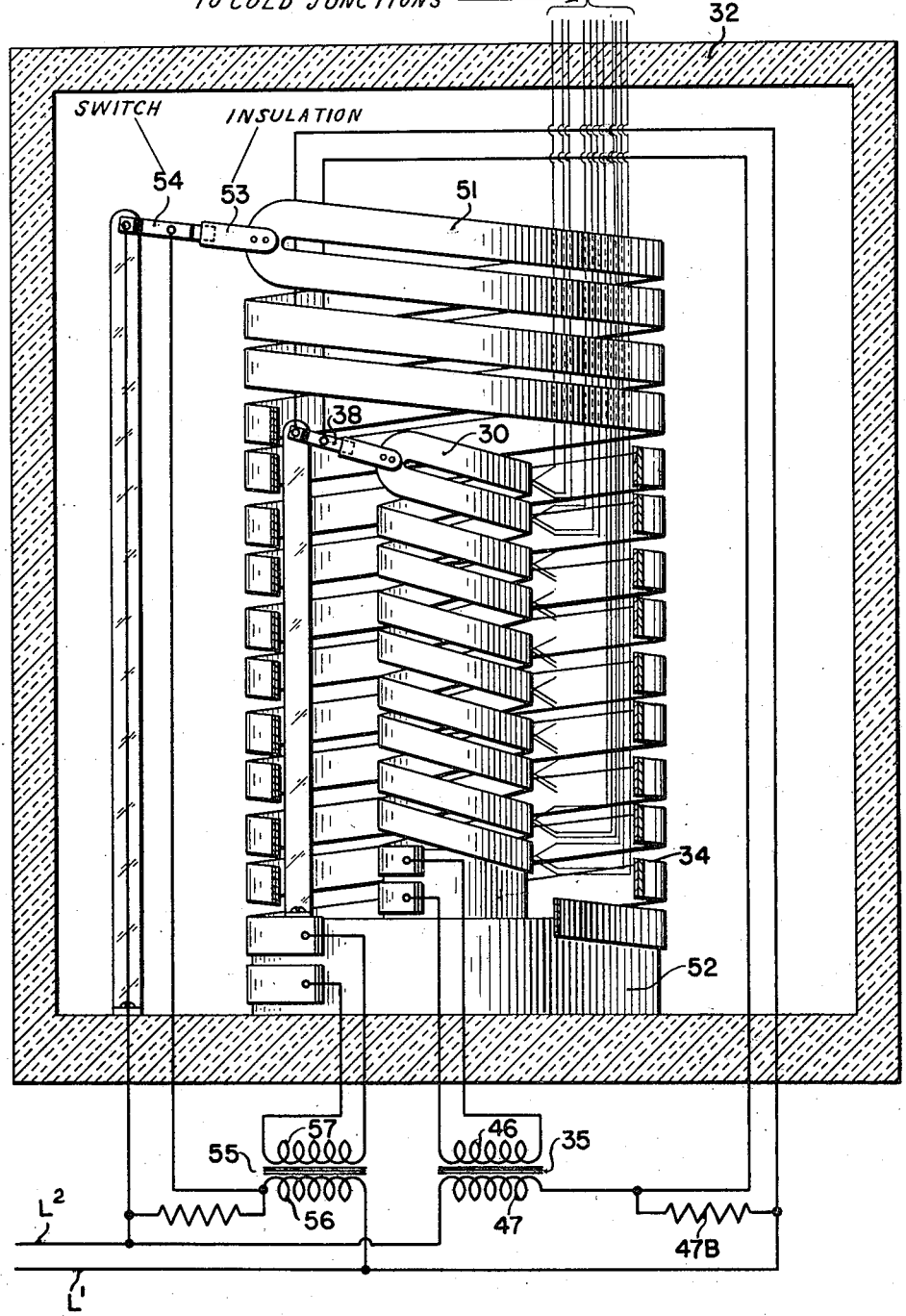

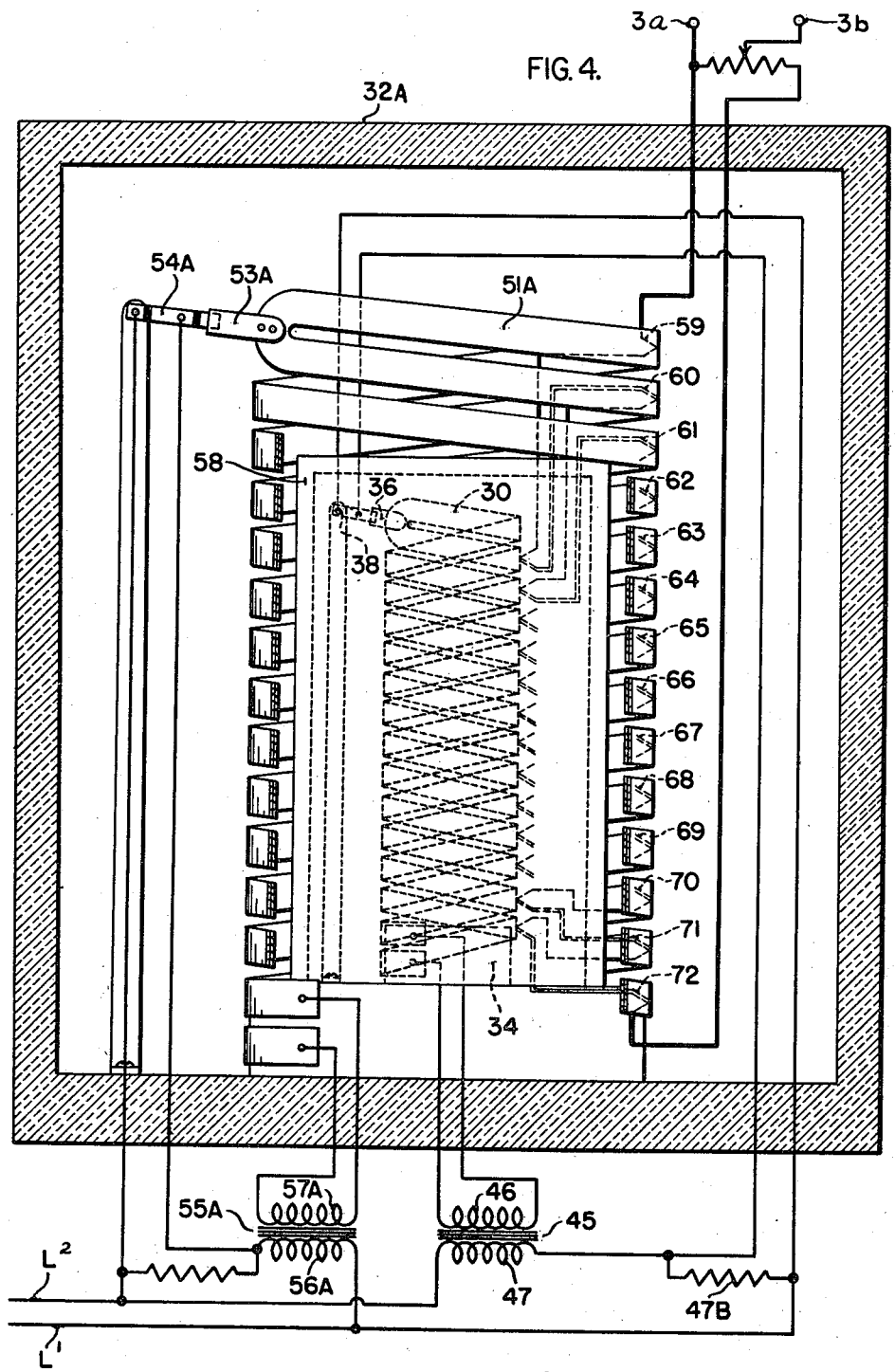

Patented Feb. 23, 1943

2,312,022

UNITED STATES PATENT OFFICE 2,312,022

CONSTANT DIRECT CURRENT SOURCE

Herbert B. Brooks, Washington, D. C., assignor to The Brown Instrument Company, Philadelphia, Pa., a corporation of Pennsylvania Application May 3, 1940, Serial No. 333,090

17 Claims. (Cl. 136—4)

The present invention relates to measuring instruments and more particularly to electrical measuring instruments adapted to measure the magnitude or changes in magnitude of electrical, chemical, physical and other conditions.

An object of the invention is to provide apparatus for deriving a source of direct current voltage of high constancy from a commercial source of electric current notwithstanding the usual and substantial fluctuations in voltage of the commercial source.

Another object of the invention is to provide apparatus for deriving a source of direct current voltage of high constancy from a commercial source of current which may be either alternating or continuous.

A further object of the invention is to provide apparatus for deriving a source of direct current voltage of high constancy which is simple and rugged in construction and is adapted to operate efficiently and accurately for long periods of time without requiring attention.

A still further object of the present invention is to provide apparatus for deriving a source of direct current potential of high constancy from a commercial current source in which there is complete electrical isolation between the derived current and the commercial current source.

In the art of electrical measurements there are many applications in which a direct current potential of high constancy of magnitude is necessary to the attainment of accurate measurements. The measurement of thermoelectric potentials, potentials derived by so-called hydrogen ion electrodes, or other minute potentials are some examples of electrical measuring applications requiring the use of a direct current potential of high constancy of magnitude. So-called dry cells and other forms of batteries have been employed in the prior art for this purpose but have many disadvantages which render them undesirable, particularly when accurate measurements for long periods of time are desired. The direct current voltage obtained from batteries, for example, varies with age and use and therefore these batteries must be replaced quite often and in addition, during the life of the battery some provision must be made for recalibrating the measuring instrument at frequent intervals to compensate for the voltage changes. Some prior art measuring instruments have employed manual recalibrating provisions and other prior art instruments have employed automatic recalibrating provisions. The method of effecting the recalibrating operation, however, is the same irrespective of whether manual or automatic recalibrating provisions are employed and usually consists of comparing the voltage of the battery with the voltage of a so-called standard cell. Such prior art arrangements have proven satisfactory in operation, but as pointed out above, have required frequent checking of the battery voltage. In the case of manual recalibration, moreover, the attention at frequent intervals of an operator or service man is required. In the case of automatic recalibration expensive auxiliary apparatus is required which not only increases the initial cost of the measuring instrument but also requires the attention of an operator or a service man periodically if it is to be maintained in satisfactory operating condition. Whether the recalibration adjustment is effected manually or automatically, moreover, care must be exercised that excessive current will not pass through the standard cell because the standard cell would be thereby rendered permanently or temporarily inoperative due to polarization thereof. Both the manual and automatic recalibrating arrangements furthermore have the further disadvantage that inaccuracies may be introduced into the measuring operation during the interval between recalibrating adjustments.

The disadvantages of the prior art arrangements pointed out above have been overcome by the device of my present invention which is adapted to derive a source of direct current voltage of high constancy from a commercial source of electric current in such manner that the changes in voltage of the commercial source are immediately and continuously compensated for. This instrument is interposed between the commercial source of current and the measuring circuit or network and is adapted to operate with a high degree of precision over long periods of time without attention.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Of the drawings:

Fig. 1 is a diagrammatic view illustrating one embodiment of the invention as adapted for use in measuring and recording the temperature in a furnace;

Figs. 2 and 2A illustrate in detail portions of the arrangement of Fig. 1; and

Figs. 3 and 4 illustrate further modifications of the device of my invention.

In Fig. 1 of the drawings I have illustrated more or less diagrammatically the use of the apparatus of my invention in an instrument for measuring and recording the magnitude and changes in magnitude of the voltage produced by a thermocouple 1. The thermocouple 1 is shown extending into the interior of a furnace 2, the temperature of the interior of which is to be measured and develops a voltage which varies in magnitude in accordance with the furnace temperature variations. It will be understood that the device of my invention is not limited in its application to measuring temperature conditions but may be employed with equal facility in the measurement of other small direct current potentials, which, for example, may vary in accordance with hydrogen ion concentration of fluids, turbidity, smoke density and other conditions from which a direct current potential may be derived which is a function of the magnitude of the condition. The device of my invention may also be employed with equal facility to provide a direct current voltage of high constancy for energizing direct current Wheatstone and other types of bridges, if desired.

In the arrangement specifically illustrated in Fig. 1 of the drawings the voltage developed by the thermocouple 1 is applied to the terminals of a potentiometric measuring circuit 3 which circuit may be of any suitable type and is balanced against a voltage in the potentiometric measuring circuit which is variable by the relative movement of a contact 5 and a pair of elongated slidewire resistances 4 and 4' with which the contact 5 is in slideable engagement. The potentiometric measuring circuit 3 may desirably be of the form disclosed in the Harrison et al. Patent 2,150,502, issued March 14, 1939. The potentiometric measuring circuit 3 is of a well known type, and therefore, it is believed sufficient for the present purposes to note that it includes a circuit branch in which the thermocouple 1 is connected, a circuit branch in which a source of known potential and the slidewire resistances 4 and 4' are connected, a variable portion of which resistances may be connected into the opposed branches by means of sliding contact 5 whereby the respective effects of the variable and known voltage sources are made equal and opposite when the contact 5 is in a position along resistances 4 and 4' corresponding to the magnitude of the thermocouple voltage. The position of the contact 5 then provides a measure of the magnitude of the thermocouple voltage and may serve as a measure of the temperature to which the thermocouple is subjected.

The source of known potential referred to above is applied between junctions 3a and 3b of the potentiometer circuit and is derived by means of apparatus, indicated generally at 6 and described in detail hereinafter, from commercial alternating current supply lines $L^1$ and $L^2$. As is explained hereinafter the source of constant direct current potential may be derived by a slightly modified arrangement 6 from a commercial source of direct current, if desired.

The movable contact 5 of the potentiometer circuit is attached to a suitable carrier 7 which may be in the form of an internally threaded nut adapted to ride on a screw threaded rod 8 which is rotated in one direction or the other under control of the voltage developed by the thermocouple 1. A suitable reversible electrical motor 9 is coupled in any convenient manner to the screw threaded rod 8 and rotates the latter in the desired direction at the desired speed and thereby adjusts the contact 5 along the slidewire resistances 4 and 4' to rebalance the potentiometric circuit 3 upon unbalance of the latter.

A suitable detecting device, indicated generally at 10, is connected to the terminals 3c and 3d of the potentiometric measuring circuit, which terminals are at the same potential when the potentiometric circuit is balanced and the potentials of which vary in accordance with the sense and extent of potentiometer unbalance. In effect the detecting device 10 is connected in series with a known portion of the voltage derived from the arrangement 6 and the unknown voltage of thermocouple 1. The detecting device 10 includes an interrupter or converter 11, a transformer 12 and an electronic amplifier 13. The interrupter 11 includes a pair of cooperating contacts 14 and 15 which are periodically actuated into and out of engagement with each other by an electromagnetic vibrator having an actuating winding 16 which is energized from the alternating current supply conductors $L^1$ and $L^2$. The contacts 14 and 15 of interrupter 11 are connected in a series circuit including the known and unknown voltages of the potentiometric circuit, and the primary winding 17 of transformer 12 which also includes a secondary winding 18. The periodic engagement and separation of the interrupter contacts 14 and 15 operates to convert the potentiometer unbalanced direct currents into pulsating currents which flow in one direction or the other through the transformer primary winding 17 depending upon the direction of potentiometric unbalance. The pulsating current flow so produced through the primary winding 17 of transformer 12 causes the induction of an alternating voltage in the transformer secondary winding 18. This alternating voltage is of one phase or of opposite phase depending upon the direction of the pulsating current flow through the primary winding 17 and is applied to the input terminals of amplifier 13 wherein it is amplified. The amplified quantity is applied to one winding 19 of the reversible motor 9 which as illustrated also includes a winding 20 connected to the alternating current supply lines $L^1$ and $L^2$ through a condenser 21.

The reversible motor 9 is of the induction variety and includes a squirrel cage rotor 22 and two pairs of oppositely disposed field poles (not shown) on which the windings 19 and 20 are wound. Winding 19 is wound on one of said pairs of field poles and winding 20 is wound on the other pair of field poles. Due to the action of condenser 21 the current which flows through the winding 20 will lead the current of the alternating current supply lines $L^1$ and $L^2$ by substantially 90°. The current supplied the winding 19 of motor 9 is in phase with or 180° out of phase with the supply line voltage and establishes a field in the rotor 22 which is displaced substantially 90° in the forward or in the backward direction with respect to the field established therein by the winding 20 depending upon the direction of potentiometer unbalance. Reaction between the field set up by the windings 19 and 20 in the rotor 22 establishes a rotating field in the rotor which rotates in one direction or the other depending upon the direction of potentiometer unbalance and thereby produces rotation of the rotor 22 in a corresponding direction. The rotor 22 is thus actuated to effect an adjustment of the contact 5 along the resistances 4 and 4' of the potentiometric circuit 3 to rebalance the latter upon unbalance thereof.

The arrangement 6 referred to hereinbefore for deriving a direct current voltage of high constancy from the alternating current supply conductors L¹ and L² includes a plurality of thermocouples indicated at 23—29 which are connected in series in additive relation and have the output terminals thereof connected to the junctions 3a and 3b of the potentiometric circuit. The polarity of the output voltage of the thermocouples is that indicated. The "hot" junctions of the thermocouple have been indicated by the reference numerals 23A and are maintained at a predetermined substantially constant temperature by a thermostatic device 30 described hereinafter and the "cold" junctions of the thermocouples have been indicated by the reference numerals 23B and are maintained at a predetermined substantially constant lower temperature by a thermostatic device 31 which may be identical in construction with the thermostatic device 30. The "hot" and "cold" junctions are maintained in any suitable manner in good thermal contact with the devices 30 and 31 but are electrically insulated therefrom as is illustrated more or less diagrammatically in Fig. 2A which is a cross sectional view of the bimetallic strip 30 showing insulating material 30A between one of the hot junctions 23A and the bimetallic strip 30.

The thermostatic devices 30 and 31 are contained in suitable housings 32 and 33, respectively, and are each composed of two elongated metal members having different temperature coefficients of expansion which are welded, riveted or soldered together along their entire length. Such members are sometimes referred to as bimetallic elements and have the property of changing their shape or warping in accordance with changes in the temperature to which they are exposed. As illustrated, the thermostatic members 30 and 31 are both constructed in the form of a helix from elongated hairpin bimetallic elements and are rigidly supported at their open end to respective insulating blocks 34 and 35. The blocks 34 and 35 are mounted in any convenient manner in their associated housings 32 and 33. The other or closed end of the thermostatic devices 30 and 31 carries members 36 and 37, respectively, which members are preferably of insulating material and are disposed in cooperative relation with associated and relatively stationary switch mechanisms 38 and 39 individual thereto. The relation of the member 36 with its associated switch mechanism 38 is illustrated in detail in Fig. 2. The relation of the member 37 with its associated switch mechanism 39 may be precisely identical with that between the member 36 and the switch mechanism 38.

As illustrated in Fig. 2, the switch mechanism 38 is comprised of a pair of electrically conductive elongated arms 40 and 41 which are slightly displaced from each other along their length and are both supported at the same end by a block of insulating material 42. The arms 40 and 41 each carry respective contacts 43 and 44 at the end thereof remote from the block 42, which contacts are normally in engagement but are adapted to move out of engagement when the arm 41 is deflected away from the arm 40. The arm 41 is longer and relatively flexible compared with arm 40 and extends into the path of movement of the member 36 so that the member 36 is adapted to engage arm 41 and to move the latter away from arm 40.

When the temperature to which the thermostatic device 30 is subjected is a predetermined value, the member 36 will be in engagement with switch arm 41 and the contacts 43 and 44 will also be in engagement. Upon an increase in temperature member 36 is actuated by the device 30 in the direction to separate the contacts 33 and 34 and upon a decrease in temperature the member 36 is actuated by the device 30 in the opposite direction to thereby permit the contacts 43 and 44 to move into engagement under the action of flexible arm 41.

On a change in the temperature of the device 30 or 31 the latter warps in one direction or the other to adjust the member 36 or 37 associated therewith into or out of engagement with the associated switch mechanism 38 or 39 and as a result of such engagement or disengagement the temperature of the device 30 or 31 is varied in one direction or the other by means under control of the contacts of the switch mechanism and described hereinafter to effect a return of the temperature to a predetermined value and thereby effect the return of the member 36 or 37 to a normal positional relation with its associated switch mechanism.

The positional relation that normally exists between the members 36 and 38 or 37 and 39 is one wherein the contacts of the switch mechanism are in chattering engagement so that normally the periods during which the member 36 or 37 is actuated for movement in opposite directions are so minute that the said members are given no movement of significant extent. Upon a change in the temperature of the device 30 or 31, however, the period of engagement or disengagement of the contacts of the associated switch mechanism is increased or decreased whereupon device 30 or 31 is actuated in the proper direction to restore the normal positional relation between the members 36 and 38 or the members 37 and 39.

The means referred to above for controlling the temperature of the devices 30 and 31 and thereby for maintaining the normal positional relation of members 36 and 38 or 37 and 39 utilizes the electrical resistance of the devices 30 and 31 to the flow of electric current therethrough for producing a heating effect in said device. The means for controlling the temperature of device 30 includes a transformer 45 having a secondary winding 46 the terminals of which are connected to a respective section of the open end of the device 30 and a line voltage primary winding 47. The means for controlling the temperature of device 31 includes a transformer 48 having a secondary winding 49 the terminals of which are connected to a respective section of the open end of the device 31 and a line voltage primary winding 50. One terminal of the primary winding 47 of transformer 45 is connected to the supply conductor L² and the other terminal is connected through the contacts 43 and 44 of the switch mechanism 38 to the supply conductor L¹. One terminal of the primary winding 50 of the transformer 48 is connected to the supply conductor L² and the other terminal is connected through the contacts of the switch mechanism 39 the supply conductor L¹. The energization of the transformer 45 therefore is controlled by the switch mechanism 38 and the energization of the transformer 48 is controlled by the switch mechanism 39.

When the contacts 43 and 44 of the switch mechanism 38 are in engagement, the transformer 45 is energized to supply electric current to the thermostatic device 30. When the contacts 43 and 44 are out of engagement the supply of current to the thermostatic device 30 is cut off. If desired, a resistance 47B of suitable magnitude may be connected in shunt to the switch 38, as shown, so that the electric current variations to the device 30 are reduced, thereby permitting closer control of the temperature of the latter at the desired value. A similar resistance 50B may be connected in shunt to the switch mechanism 39. The thermostatic device 30 is so constructed that when electric current is supplied to it and the temperature of the device 30 is thereby increased, it warps in a direction to separate the contacts 43 and 44. Conversely when electric current to the device 30 is cut off or reduced, it is permitted to cool and warps in the opposite direction to bring the contacts 43 and 44 into engagement. Suitable stops (not shown) are desirably provided to limit the extent of deflection or warping of the devices 30 and 31 to thereby prevent the devices 30 and 31 from unwinding and unduly displacing the thermocouples 23—29 when the system is not in operation.

It will be apparent that such operation will maintain the device 30 at a predetermined temperature with a high degree of constancy. To facilitate the attainment of this end the housing 32 is provided which prevents the establishment of air currents in the vicinity of the device 30 which air currents are usually not constant in their effect and would therefore tend to cause variation in the temperature of the device 30. The housing 32, moreover, may desirably be of material having low heat conductivity so that the loss of heat from the device 30 is maintained suitably small in magnitude.

Thermostatic device 31 and its associated switch mechanism 39 cooperate in a manner similar to that described above and operate to control the supply of electric current to the device 31 and thereby to maintain the temperature thereof constant to a high degree of precision. Since the thermostatic devices 30 and 31 operate both as a source of heat and the heat responsive device, there is a minimum of lag between the time of occurrence of a temperature change and the time when a correction for that temperature change is effected. This permits the temperature of the devices 30 and 31 to be maintained constant with a high degree of accuracy and thereby the attainment of a voltage from the thermocouples of a magnitude of high constancy.

The thermostatic devices 30 and 31 and their associated switch mechanisms are so adjusted that the temperature maintained by the device 30 is a predetermined value desirably several hundred degrees Fahrenheit higher than the temperature maintained by the device 31. As noted hereinbefore the hot junctions of the thermocouples are maintained at the temperature of the device 30 and the cold junctions are maintained at the temperature of the device 31. Since the temperatures of the devices 30 and 31 are constant to a high degree of precision, the difference in temperature between these devices is maintained substantially constant, and accordingly, the difference in temperature between the hot and cold junctions of the thermocouples is maintained substantially constant. The voltage developed by the thermocouples, therefore, will have a high constancy of magnitude.

While the hot junctions of the thermocouples have been indicated in the drawings as disposed in a straight line on one side only of the thermostatic device 30, and the cold junctions of the thermocouples have been indicated as disposed in a straight line on one side only of the thermostatic device 31, it will be clear that the hot junctions of the thermocouples may be distributed all around the helix 30 and the cold junctions may be distributed around the helix 31. The distribution of the hot and cold junctions around the helices 30 and 31 may desirably be uniform. Such construction permits the attainment of an extremely high degree of constancy in the voltage developed by the thermocouples.

In Fig. 3 I have illustrated, more or less diagrammatically, a modification of the arrangement of Fig. 1 wherein the thermostatic device 30 is illustrated as positioned within a second thermostatic device 51 which is supported by an insulating block 52 within the housing 32. The thermostatic device 51 may be constructed in a manner similar to the manner in which the device 30 is constructed and carries an insulating member 53 which is disposed in operative relation with a switch mechanism 54. The switch mechanism 54 is connected in circuit with the primary winding 56 of a transformer 55 having a secondary winding 57 across the alternating current supply conductors L¹ and L² and on variation of the temperature thereof from a predetermined value operates to open and close the switch mechanism as required to maintain a given temperature.

By placing the thermostatic device 30 within a thermostatic device 51 and adjusting the temperature of the latter to a value slightly lower than the temperature of that of the device 30, the temperature variations of the device 30 may be considerably reduced and thereby the voltage output of the thermocouple arrangement may be maintained constant with a higher degree of accuracy. The device 51 is desirably adjusted to maintain a temperature slightly lower in value than the device 30 to avoid the possibility of the latter becoming overheated. That is to say, if the device 30 is overheated, it should be permitted to cool. While only the device 30 has been shown in Fig. 3 as disposed within a second thermostatic device, it will be clear that the device 31 of Fig. 1 may also be mounted within a second thermostatic device similar to the device 51 and which is adjusted to maintain a temperature slightly lower than the temperature of the device 31 to thereby reduce the temperature variations of the latter.

In Fig. 4 I have illustrated schematically another modification of the arrangement of Fig. 1 in which the "hot" junction temperatures of thermocouples 59—72 are maintained constant by a thermostatic device 30 and the "cold" junction temperatures of the thermocouples are maintained constant by a thermostatic device 51A. In this modified arrangement the thermostatic device 31 of the Fig. 1 arrangement may therefore be dispensed with. As illustrated, the thermostatic device 30 is positioned within the thermostatic device 51A, and the thermostatic devices 30 and 51A are thermally insulated from each other by a housing 58 of suitable heat insulating material which completely covers the thermostatic device 30. The thermocouple leads between the "hot" and "cold" junctions are passed through the housing 58 in any suitable manner. The thermostatic devices 30 and 51A are desirably supported on suitable insulating blocks within a housing 32A of suitable heat insulating material.

The thermostatic device 51A may be constructed in a manner similar to the manner in which the device 30 is constructed and carries an insulating member 53A at its upper end which is disposed in operative relation with a switch mechanism 54A. The switch mechanism 54A is connected in circuit with the primary winding 56A of a transformer 55A (having a secondary winding 57A) across the alternating current supply conductors $L^1$ and $L^2$. The thermostatic device 51A is so adjusted in relation with the switch mechanism 54A as to maintain a temperature of approximately the same value as the temperature maintained by the thermostatic device 31 of the Fig. 1 arrangement.

The "hot" junctions of the thermocouples 59—72 in this modified form of my invention as in the Figs. 1 and 3 arrangements are suitably distributed along the surface of the thermostatic device 30 and the "cold" junctions of the thermocouples are suitably distributed along the surface of the thermostatic device 51A.

While the commercial source of alternating current for supplying energizing current to the thermostatic devices 30, 31, 51 and 51A has been indicated as an alternating current source, it will be understood that a commercial source of direct or continuous current may be used with equal facility if desired. In such modification the transformers associated with said thermostatic devices are not needed. The Fig. 1 arrangement may be so modified, for example, by connecting one terminal of the direct current source to one of the open ends of thermostatic devices 30 and 31, and connecting the other terminal of said source through the switch mechanisms 38 and 37 to the respective remaining open end of devices 30 and 31. Opening and closing of the switch contacts will then operate to control the flow of energizing direct current through the devices 30 and 31 and thereby operate to control the flow of energizing direct current through the devices 30 and 31 and thereby operate to control the temperature of said devices as explained in connection with Fig. 1. It will also be understood that direct current may be used in a similar manner to heat the auxiliary thermostatic devices 51 and 51A when the latter are employed.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Apparatus for deriving a direct current potential of high constancy from a commercial current source notwithstanding substantial variation in voltage of said commercial current source comprising means for transforming current from said commercial source into a source of heat of predetermined temperature, means for transforming current from said commercial source into a source of heat of predetermined temperature different from the temperature of said first mentioned heat source, and heat responsive electric potential producing means exposed to both of said heat sources and operative to produce a direct current potential in accordance with the difference in temperature of said heat sources.

2. Apparatus for deriving a direct current potential of high constancy from a commercial current source notwithstanding substantial variation of voltage of said commercial current source comprising means for transforming current from said commercial source into a source of heat of predetermined temperature, means for transforming current from said commercial source into a second source of heat of lower temperature than the temperature of said first mentioned heat source, means to control said commercial current source to maintain said heat sources substantially constant, and a thermopile having the hot junctions thereof exposed to said first mentioned heat source and the cold junctions thereof exposed to said second mentioned heat source.

3. Apparatus for deriving a direct current potential of high constancy from a commercial current source notwithstanding substantial variation in voltage of said commercial current source comprising a bimetallic element which is adapted to be heated upon the passage of electric current therethrough, means to pass electric current through said bimetallic element to heat said bimetallic element to a predetermined temperature including an electrical energizing connection from said commercial current source to said bimetallic element, means to maintain said bimetallic element at said predetermined temperature including a switch under control of said bimetallic element adapted to open and close said electrical connection, and heat responsive electric potential producing means operative to produce a direct current potential in accordance with the temperature to which it is subjected exposed to said bimetallic element.

4. The combination of claim 3 and means to maintain substantially constant the temperature of the region in which said bimetallic element is positioned.

5. The combination of claim 3 and means to maintain the temperature of the region in which said bimetallic element is located substantially constant at approximately the temperature value at which said bimetallic element is maintained.

6. Apparatus for deriving a direct current potential of high constancy from a commercial current source notwithstanding substantial variation in voltage of said commercial current source comprising a bimetallic element which is adapted to be heated upon the passage of electric current therethrough, means to pass electric current through said bimetallic element to heat said bimetallic element to a predetermined temperature including an electrical energizing connection from said commercial current source to said bimetallic element, means to maintain said bimetallic element at said predetermined temperature including a switch under control of said bimetallic element adapted to open and close said electrical connection, and thermoelectric means exposed to the temperature of said bimetallic element.

7. Apparatus for deriving a direct current potential of high constancy from a commercial current source notwithstanding substantial variation in voltage of said commercial current source comprising a bimetallic element which is adapted to be heated upon the passage of electric current therethrough, means to pass electric current through said bimetallic element to heat said bimetallic element to a predetermined temperature including an electrical energizing connection from said commercial current source to said bimetallic element, means to maintain said bimetallic element at said predetermined temperature including a switch under control of said bimetallic element adapted to open and close said electrical connection, a source of heat having a substantially constant temperature lower in value than the temperature of said bimetallic element, and a thermopile having the hot junctions thereof exposed to said bimetallic element and the cold junctions exposed to said source of heat.

8. Apparatus for deriving a direct current potential of high constancy from a commercial current source notwithstanding substantial variation in voltage of said commercial current source comprising a bimetallic element which is adapted to be heated upon the passage of electric current therethrough, means to pass electric current through said bimetallic element to heat said bimetallic element to a predetermined temperature including an electrical energizing connection from said commercial current source to said bimetallic element, means to maintain said bimetallic element at said predetermined temperature including a switch under control of said bimetallic element adapted to open and close said electrical connection, a second bimetallic element which is adapted to be heated upon the passage of electric current therethrough, means to pass electric current through said bimetallic element to heat said second mentioned bimetallic element to a predetermined temperature which is lower in value than the temperature of said first mentioned bimetallic element including an electrical connection from said commercial current source to said second mentioned bimetallic element, means to maintain the temperature of said second mentioned bimetallic element at said predetermined lower temperature including a switch under control of said second mentioned bimetallic element adapted to open and close said second mentioned electric connection, and heat responsive electric potential producing means exposed to both of said bimetallic elements and operative to produce a direct current potential in accordance with the temperature difference therebetween.

9. The combination of claim 8 including means to maintain the temperature of the region in which said first mentioned bimetallic element is positioned substantially constant at approximately said predetermined temperature value and means to maintain the temperature of the region in which said second mentioned bimetallic element is positioned substantially constant at approximately said predetermined lower temperature value.

10. Apparatus for deriving a direct current potential of high constancy from a commercial current source notwithstanding substantial variation in voltage of said commercial current source comprising a bimetallic element which is adapted to be heated upon the passage of electric current therethrough, means to pass electric current through said bimetallic element to heat said bimetallic element to a predetermined temperature including an electrical energizing connection from said commercial current source to said bimetallic element, means to maintain said bimetallic element at said predetermined temperature including a switch under control of said bimetallic element adapted to open and close said electrical connection, a second bimetallic element which is adapted to be heated upon the passage of electric current therethrough, means to pass electric current through said bimetallic element to heat said second mentioned bimetallic element to a predetermined temperature which is lower in value than the temperature of said first mentioned bimetallic element including an electrical connection from said commercial current source to said second mentioned bimetallic element, means to maintain the temperature of said second mentioned bimetallic element at said predetermined lower temperature including a switch under control of said second mentioned bimetallic element adapted to open and close said second mentioned electric connection, and thermoelectric means subjected to the difference in temperature between said bimetallic elements to produce a direct current potential.

11. Apparatus for deriving a direct current potential of high constancy from a commercial current source notwithstanding substantial variation in voltage of said commercial current source comprising a bimetallic element which is adapted to be heated upon the passage of electric current therethrough, means to pass electric current through said bimetallic element to heat said bimetallic element to a predetermined temperature including an electrical energizing connection from said commercial current source to said bimetallic element, means to maintain said bimetallic element at said predetermined temperature including a switch under control of said bimetallic element adapted to open and close said electrical connection, a second bimetallic element which is adapted to be heated upon the passage of electric current therethrough, means to pass electric current through said bimetallic element to heat said second mentioned bimetallic element to a predetermined temperature which is lower in value than the temperature of said first mentioned bimetallic element including an electrical connection from said commercial current source to said second mentioned bimetallic element, means to maintain the temperature of said second mentioned bimetallic element at said predetermined lower temperature including a switch under control of said second mentioned bimetallic element adapted to open and close said second mentioned electric connection, and a thermopile having the hot junctions thereof exposed to said first mentioned bimetallic element and the cold junctions thereof exposed to said second mentioned bimetallic element to produce a direct current potential.

12. Apparatus for deriving a direct current potential of high constancy from a commercial current source notwithstanding substantial variation in voltage of said commercial current source comprising a bimetallic element of hairpin shape wound in a helical form and which is heated upon the passage of electric current therethrough, means to pass electric current through said bimetallic element to heat said bimetallic element to a predetermined temperature including an electrical energizing connection from said commercial current source to said bimetallic element, means to control the temperature of said bimetallic element at said predetermined value including a switch under control of said bimetallic element adapted to open and close said connection, a second bimetallic element of hairpin shape wound into a helical form and which is heated upon the passage of electric current therethrough, means to pass electric current through said bimetallic element to heat said second mentioned bimetallic element to a predetermined temperature lower than the temperature of said first mentioned bimetallic element including an electrical energizing connection from said commercial current source to said second mentioned bimetallic element, means to control the temperature of said second mentioned bimetallic element at said predetermined lower temperature including a switch under control of said second mentioned bimetallic element adapted to open and close said connection, and heat responsive electric potential producing means exposed to the difference in temperature between said bimetallic elements and operative to produce a direct current potential.

13. Apparatus for deriving a direct current potential of high constancy from a commercial current source notwithstanding substantial variation in voltage of said commercial current source comprising a bimetallic element of hairpin shape wound in a helical form and which is adapted to be heated upon the passage of electric current therethrough, means to pass electric current through said bimetallic element to heat said bimetallic element to a predetermined temperature including an electrical energizing connection from said commercial current source to said bimetallic element, means to control the temperature of said bimetallic element at said predetermined value including a switch under control of said bimetallic element adapted to open and close said connection, a second bimetallic element of hairpin shape wound into a helical form and which is adapted to be heated upon the passage of electric current therethrough, means to pass electric current through said bimetallic element to heat said second mentioned bimetallic element to a predetermined temperature lower than the temperature of said first mentioned bimetallic element including an electrical energizing connection from said commercial current source to said second mentioned bimetallic element, means to control the temperature of said second mentioned bimetallic element at said predetermined lower temperature including a switch under control of said second mentioned bimetallic element adapted to open and close said connection, and thermoelectric means exposed to the difference in temperature between said bimetallic elements to produce a direct current potential.

14. Apparatus for deriving a direct current potential of high constancy from a commercial current source notwithstanding substantial variation in voltage of said commercial current source comprising a bimetallic element of hairpin shape wound in a helical form and which is adapted to be heated upon the passage of electric current therethrough, means to pass electric current through said bimetallic element to heat said bimetallic element to a predetermined temperature including an electrical energizing connection from said commercial current source to said bimetallic element, means to control the temperature of said bimetallic element at said predetermined value including a switch under control of said bimetallic element adapted to open and close said connection, a second bimetallic element of hairpin shape wound into a helical form and which is adapted to be heated upon the passage of electric current therethrough, means to pass electric current through said bimetallic element to heat said second mentioned bimetallic element to a predetermined temperature lower than the temperature of said first mentioned bimetallic element including an electrical energizing connection from said commercial current source to said second mentioned bimetallic element, means to control the temperature of said second mentioned bimetallic element at said predetermined lower temperature including a switch under control of said second mentioned bimetallic element adapted to open and close said connection, and a thermopile having the hot junctions thereof distributed along the surface of said first mentioned bimetallic element and the cold junctions thereof distributed along the surface of said second mentioned bimetallic element to produce a direct current potential.

15. Apparatus for deriving a direct current potential of high constancy from a commercial current source notwithstanding substantial variation in voltage of said commercial current source comprising a bimetallic element of hairpin shape wound in helical form and which is adapted to be heated upon the passage of electric current therethrough, an insulating member to rigidly support one end of said bimetallic element, a switch disposed in operative engagement with the other end of said bimetallic element and adapted to be opened and closed as the latter deflects in one direction or the other from a predetermined position, means to pass electric current through said bimetallic element to heat said bimetallic element to a predetermined temperature including a transformer having a primary winding and a secondary winding and having the primary winding thereof connected through said switch to said commercial current source and having the terminals of the secondary winding thereof connected to the open ends of said bimetallic element, a second bimetallic element of hairpin shape wound in helical form and which is adapted to be heated upon the passage of electric current therethrough, an insulating member to rigidly support one end of said second mentioned bimetallic member, a switch disposed in operative engagement with the other end of said second mentioned bimetallic element adapted to be opened and closed upon deflection of said second mentioned bimetallic element from a predetermined position, means to pass electric current through said bimetallic element to heat said second mentioned bimetallic element to a predetermined temperature which is lower in value than the temperature of said first mentioned bimetallic element including a transformer having a primary winding and a secondary winding and having its primary winding connected through said second mentioned switch to said commercial current source and having the terminals of the secondary winding thereof connected to the open ends of said second mentioned bimetallic element, and a thermopile having the hot junctions thereof distributed along the surface of said first mentioned bimetallic element and the cold junctions distributed along the surface of said second mentioned bimetallic element to produce a direct current potential.

16. The combination of claim 15 including means to maintain the temperature of the region in which said first mentioned bimetallic element is positioned substantially constant at approximately said predetermined value, and means to maintain the region in which said second mentioned bimetallic element is positioned substantially constant at approximately said predetermined lower temperature.

17. The combination of claim 15 including a third bimetallic element of hairpin shape wound in a helical form in which said first mentioned bimetallic element is positioned and a fourth bimetallic element of hairpin shape wound in helical form in which said second mentioned bimetallic element is positioned, an insulating member to rigidly support one end of said third mentioned bimetallic element, a switch disposed in operative relation with the opposite end of said third mentioned bimetallic element adapted to be opened and closed upon deflection of said third mentioned bimetallic element from a predetermined position, means to heat said third mentioned bimetallic element to substantially the same temperature at which said first mentioned bimetallic element is maintained including a transformer having a primary winding and a secondary winding and having the primary winding thereof connected through said third mentioned switch mechanism to said commercial current source and having the terminals of the secondary winding thereof connected to the open ends of said third mentioned bimetallic element, an insulating member to rigidly support one end of said fourth mentioned bimetallic element, a switch disposed in operative relation with the other end of said fourth mentioned bimetallic element, and means to heat said fourth mentioned bimetallic element to substantially the same temperature at which said second mentioned bimetallic element is maintained including a transformer having a primary winding and a secondary winding and having the primary winding thereof connected through said fourth mentioned switch to said commercial current source and having the terminals of the secondary winding thereof connected to the open ends of said fourth mentioned bimetallic element.

HERBERT B. BROOKS.